Jan. 26, 1926.
J. P. SPANG
1,570,792
MEAT TENDERER
Filed April 25, 1925    3 Sheets-Sheet 1
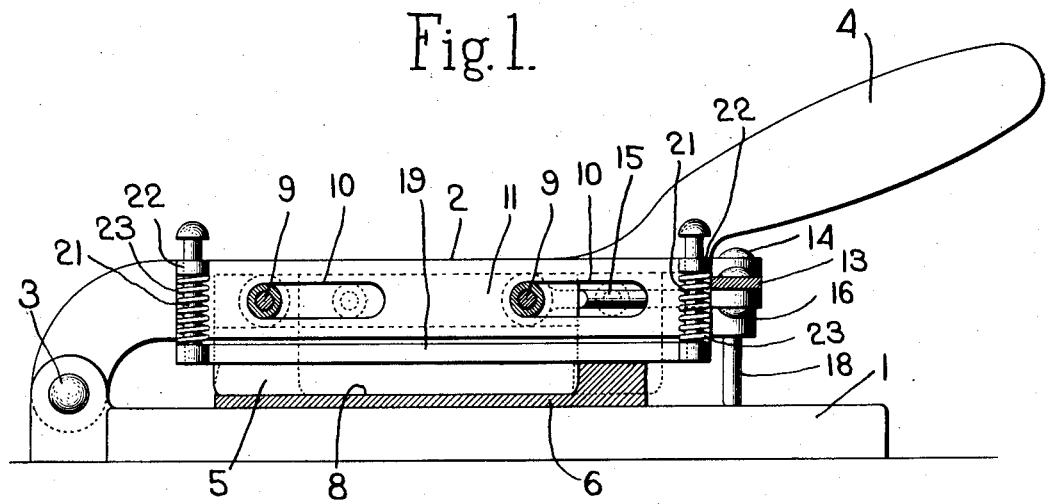
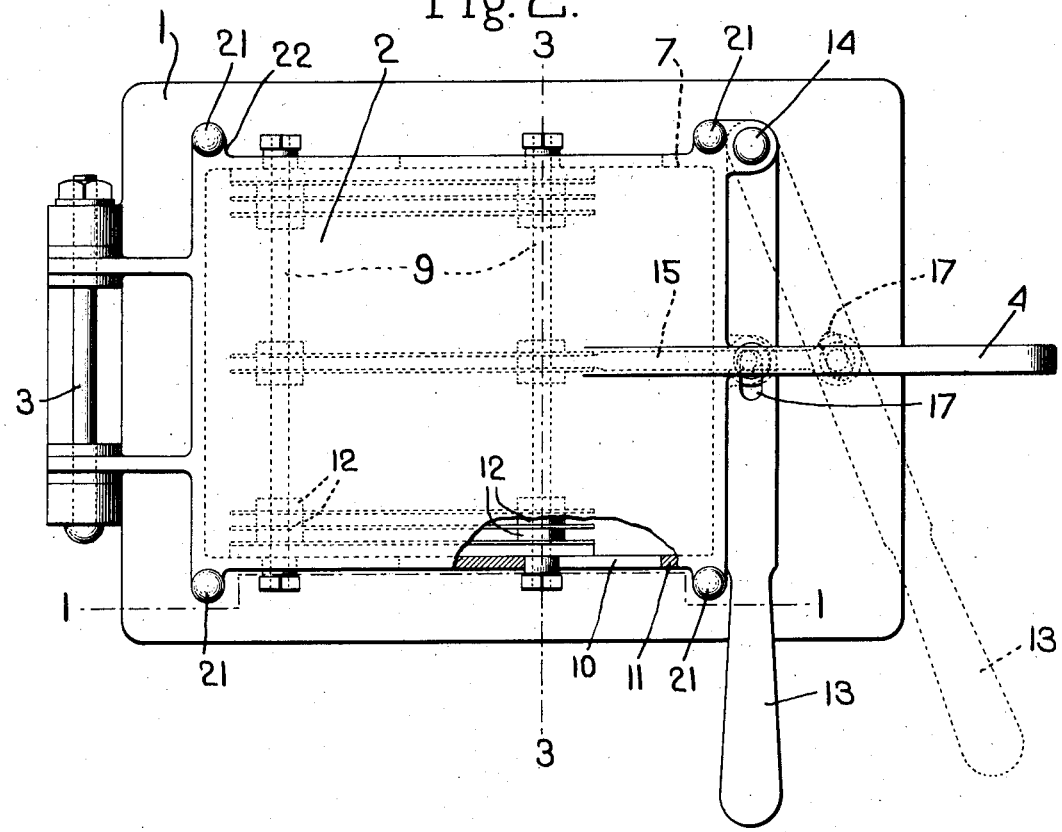
Inventor.
Joseph P. Spang
by Heard Smith & Tennant.
Attys.

Jan. 26, 1926. 1,570,792
J. P. SPANG
MEAT TENDERER
Filed April 25, 1925    3 Sheets-Sheet 2
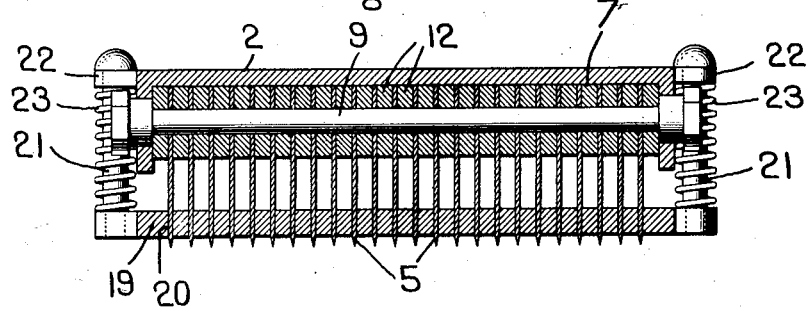
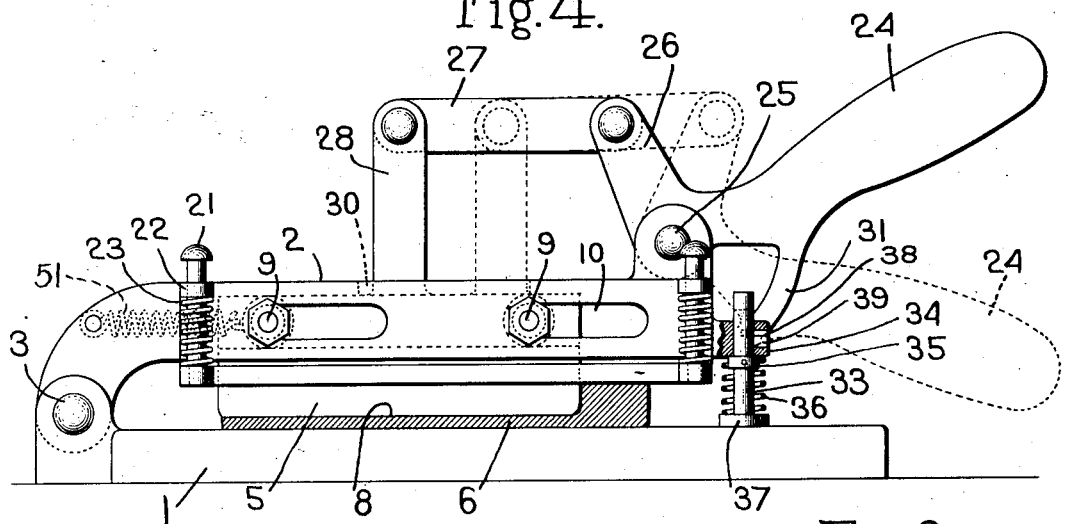
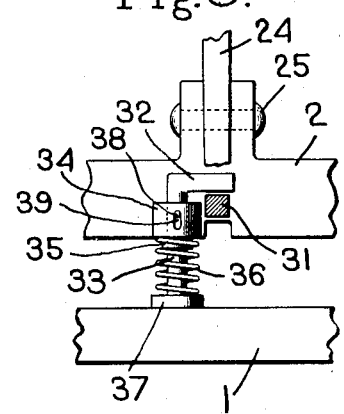
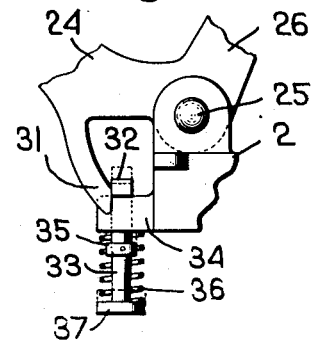
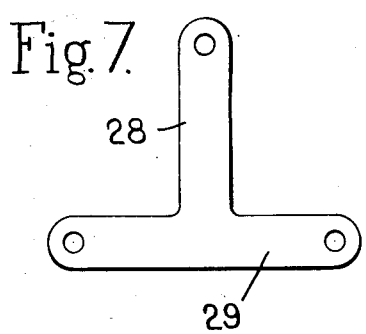
Inventor.
Joseph P. Spang
by Heard Smith & Tennant.
Attys.

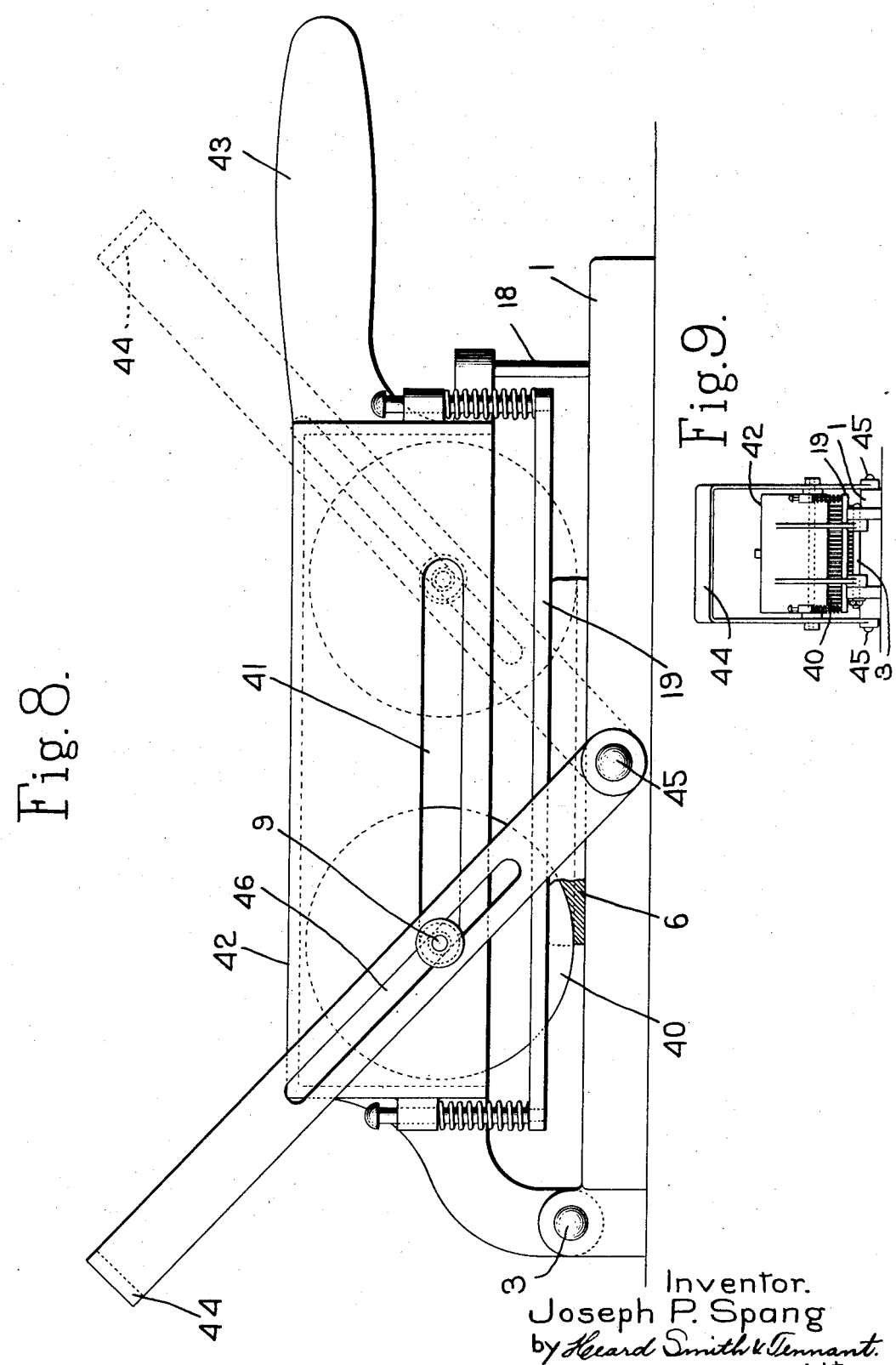

Patented Jan. 26, 1926.

1,570,792

UNITED STATES PATENT OFFICE.

JOSEPH P. SPANG, OF QUINCY, MASSACHUSETTS.

MEAT TENDERER.

Application filed April 25, 1925. Serial No. 25,898.

*To all whom it may concern:*

Be it known that I, JOSEPH P. SPANG, a citizen of the United States, and resident of Quincy, county of Norfolk, State of Massachusetts, have invented an Improvement in Meat Tenderers, of which the following description, in connection with the accompanying drawing, is a specification, like characters on the drawing representing like parts.

This invention relates to a meat-tenderer such as is used for defiberizing or slitting steaks and other pieces of meat to render them more tender. The invention has particular reference to that type of meat-tenderer which includes in its construction a bed on which the steak or other meat to be tendered is supported and a knife carrier supporting the knives, which carrier is movable toward and from the bed for the purpose of causing the knives to slit or cut partially through the meat on the bed.

One of the objects of the invention is to provide an improved meat-tenderer of this type in which the knives are slidably mounted in the knife carrier so that in addition to their movement toward the bed to cut into the meat they may have a movement parallel to the bed so that the slitting of the meat may be accomplished by a slicing action of the knives.

Other objects of the invention are to provide various improvements in meat-tenderers of this type all as will be more fully hereinafter set forth and then pointed out in the appended claims.

In the drawings wherein I have illustrated some selected embodiments of my invention, Fig. 1 is a sectional view on the line 1—1, of Fig. 2 showing a meat-tenderer embodying my invention;

Fig. 2 is a top plan view of Fig. 1;

Fig. 3 is a section on the line 3—3, Fig. 2;

Fig. 4 is a view similar to Fig. 1 but showing a different embodiment of the invention;

Figs. 5 and 6 are fragmentary details of the latch for locking the handle;

Fig. 7 is a view of the spacing bar 29 by which the handle is connected to the knives;

Fig. 8 is a side view showing a still different embodiment of the invention;

Fig. 9 is an end view of Fig. 8 on a reduced scale.

As stated above a meat-tenderer embodying my invention is of that type comprising a base member and a knife carrier movable toward and from the base member and provided with knives adapted to cut or slit the meat.

Referring first to Figs. 1 and 2 the base portion of the device is indicated at 1 and the knife carrier at 2. This knife carrier is shown as pivotally mounted to the base as indicated at 3 and it is provided with a handle 4 by which it may be swung toward and from the base.

The knives for slitting the meat are indicated at 5. I will preferably employ a plurality of these knives arranged in close proximity to each other so that when the knife-carrier is moved into its operative position as shown in Fig. 1 the knives will cut a plurality of parallel slits in the steak or other piece of meat supported on the base and which is indicated at 6.

In the present invention the knives 5 are mounted for sliding movement in the knife carrier 2 so that when the knives are in their operative position shown in Fig. 1 they may be moved back and forth parallel to the bed thus cutting the meat with a slicing or drawing cut.

The knife carrier 2 is formed on its under face with a knife-receiving recess 7 in which the back edges of the knives are received, the cutting edges 8 of the knives projecting below the knife-carrier. The knives are supported on two rods 9 which extend from one side to the other of the knife-carrier and the ends of which operate in slots 10 formed in the side walls 11 of the knife-carrier. The knives are spaced from each other by means of spacing washers 12 mounted on the rods. In the construction shown in Figs. 1 and 2 the knives are given their sliding movement by means of a handle or lever 13 which is pivoted to the knife-carrier as shown at 14. This handle lever 13 is connected to the knives by means of a link or stem 15 which is connected at one end to the front rod 9 and is connected at the other end to the lever by means of a pin 16 which operates in a slot 17 formed in the lever. Swinging movement of the lever 13 from the full to the dotted line position Fig. 2 will move the knives 5 from the full to the dotted line position Fig. 1.

The knife-carrier is provided with a stop pin 18 which by its engagement with the bed 1 limits the downward swinging movement of said carrier. This stop pin will preferably be of such dimension that when it rests against the bed as shown in Fig. 1 the cutting edge of the knives will be about an eighth of an inch above the bed.

In using the device the knife-carrier will be swung backwardly and the steak or other piece of meat 6 will be placed on the bed. The knife-carrier is then swung downwardly until the stop pin 18 rests against the bed and the handle 13 is then moved back and forth once or twice to cause the knives to cut slits in the steak. The knives may be given their movement during the last portion of the downward movement of the knife-carrier if desired so that at the time the knives are being pressed against the piece of meat they can be moved back and forth. The cutting of the slits in the meat for tendering it is thus accomplished not merely by pressing the knives into the meat but by a slicing or drawing cut of the knives.

The knife-carrier has associated therewith a stripping plate 19 which functions to strip the meat from the knives when the latter are raised. This stripping plate is provided with a plurality of slots 20 through which the knives pass and it is guided and retained in position by means of pins 21 rising from the corners of the stripping plate and extending through the ears 22 on the knife-carrier 2. Each pin has a spring 23 encircling it and confined between the stripping plate and the corresponding ear, these springs serving to hold the plate normally in its lowered position. When the knife-carrier is moved downwardly into its operative position shown in Fig. 2 the stripping plate will engage the top of the steak and will be forced upwardly by engagement with the steak into the position shown in Fig. 1. When the knife-carrier is thrown back after the steak has been slit the expanding movement of the springs 23 will force the stripping plate downwardly and thus strip and clear the meat from the knives.

In the construction shown in Figs. 1 and 2 the device is provided with one handle for manipulating the knife-carrier and another handle for manipulating the knives.

In Figs. 4 and 5 I have illustrated an embodiment of the invention in which both the knife-carrier and the knives are operated by means of a single handle. The bed 1, the knife-carrier 2 and the knives 5 in this embodiment of the invention are the same as found in Figs. 1 and 2. The handle which is common to the knife-carrier and the knives is indicated at 24 and it is pivoted to the knife-carrier at 25. Said handle has an arm 26 extending therefrom which is connected by a link 27 with an arm 28 that is rigid with the knives. This arm 28 is integral with a spacing member 29 which is situated between two of the knives and through which the two rods 9 pass, and said arm 28 extends upwardly through a slot 30 formed in the top of the knife-carrier 2. The swinging movement of the handle about the pivot 25 will operate to slide the knives back and forth in the knife-carrier as will be obvious. Normally the handle 24 is in the full line position Fig. 4 so that when the operator is swinging the knife-carrier downwardly by means of the handle said handle is substantially rigid with the knife-carrier. When the knife-carrier is brought into the position shown in Fig. 4 then the handle 4 is released or unlocked so that it can be swung downwardly into the dotted line position Fig. 4 thus moving the knives forwardly. The means by which this is accomplished comprises a finger 31 extending downwardly from the handle and a co-operating latch member 32 carried by the knife-carrier 2. This latch 32 is in the form of a lateral-extension extending from a stop pin 33 that is slidably mounted in a boss 34 carried by the knife-carrier 2. The stop pin 33 has a collar 35 thereon which by engagement with the boss 34 limits the upward movement of the stop pin.

36 is a spring encircling the pin, the lower end of the spring engaging the foot 37 of the pin and the upper end of the spring surrounding the collar 35 and engaging the boss 34. The stop pin 33 is provided with a lateral projection 38 operating in a slot 39 formed in the boss, this projection serving to prevent the pin from turning. Normally the expanding action of the spring 36 holds the stop pin in its lowered position shown in Fig. 6 in which the latch member 32 is in position to be engaged by the lower end of the arm 31. So long as this condition obtains the handle, therefore, may be used for swinging the knife-carrier toward and from the bed 1. When during the downward swinging movement of the knife-carrier the foot of the stop pin engages the bed 1 then the stop pin will be moved upwardly through the boss 34 thus raising the latch 32 above the lower end of the arm 31 as shown by the dotted lines Fig. 6. This releases the handle 24 so that it can then swing downwardly about the pivot 25 and thus actuates the knives as shown by dotted lines Fig. 4.

51 indicates a pulling spring which is connected at one end to the knife-carrier 2 and at the other end to the gang of knives. This spring tends normally to return the knives to their initial position shown in Fig. 4 when the handle 24 is released.

In Fig. 8, I have illustrated still another embodiment of the invention wherein the knives are in the form of cutting disks. In this embodiment the bed 1 and the knife-carrier 42 and the stripping plate 19 are substantially the same as shown in the other embodiments of the invention excepting that the knife-carrier 42 has a deeper knife-receiving recess than in the embodiment shown in Fig. 1 and the knives are in the form of cutting disks 40. These disks are mounted on a rod 9 and are spaced from each other by suitable spacing washers similar to the spacing washers 12. The ends of the rod 9 operate in slots 41 formed in the side walls of the knife-carrier 42, the latter having a handle 43 by which it is operated.

The knives are given their sliding movement by means of a bell-shaped actuator 44, the arms of which are pivoted to the sides of the bed as shown at 45. Each arm of the actuator 44 is provided with a slot 46 through which the end of the rod 9 extends.

In using this device the steak 6 to be placed on the bed 1 and the knife-carrier will be swung downwardly into its operative position as shown in Fig. 8, this position being determined by the engagement of the stop pin 18 with the bed 1. The operator then grasps the actuating member 44 and swings it forwardly about its pivot 41, such forward movement operating to move the knife 40 from the full to the dotted line position.

The gang of knives are freely rotatable, the rod 9 being capable of rotating as well as sliding in the slot 41. When, therefore, the knives are moved forwardly they will have a rolling action over the steak 6 and will thus progressively cut the slits therein.

While I have illustrated herein some selected embodiments of the invention I do not wish to be limited to the constructional features shown.

I claim:

1. In a device for tendering meat, the combination with a bed, of a knife-carrier movable toward and from the bed, cutting knives carried by said knife-carrier, and means to give the knives a movement independently of that of the knife carrier.

2. In a device for tendering meat, the combination with a bed, of a pivotally-mounted knife-carrier swingable toward and from the bed, cutting knives carried by said knife-carrier, and means to move the knives relative to and independently of the carrier while the latter is in operative position.

3. In a device for tendering meat, the combination with a bed, of a pivotally-mounted knife-carrier swingable toward and from the bed, cutting knives carried by said knife-carrier, a stop pin carried by the knife-carrier to limit its movement toward the bed, and means for moving the knives parallel to the bed when the knife-carrier is positioned by the stop pin.

4. In a device for tendering meat, the combination with a bed, of a knife carrier movable toward and from the bed, cutting knives carried by said knife carrier, each knife having a cutting edge, and means operative while the carrier is stationary to move the knives relative thereto in a direction parallel to the cutting edges.

5. In a device for tendering meat, the combination with a bed, of a pivotally-mounted knife carrier swingable toward and from the bed, cutting knives carried by said knife carrier, each knife having a straight cutting edge, and means to give the knives a movement independently of that of the carrier and in a direction parallel to the cutting edges.

6. In a device for tendering meat, the combination with a bed, of a knife carrier movable toward and from the bed, cutting knives carried by said knife carrier, and means to give the knives a movement independent of the knife carrier when the knives are in cutting position.

In testimony whereof, I have signed my name to this specification.

JOSEPH P. SPANG.